May 4, 1965   J. N. KOEHEGYI   3,181,599
PROCESS TO RAISE COMBUSTION TEMPERATURES
Filed March 5, 1958   4 Sheets-Sheet 1

INVENTOR:
Joseph N. Koehegyi
BY

May 4, 1965   J. N. KOEHEGYI   3,181,599
PROCESS TO RAISE COMBUSTION TEMPERATURES
Filed March 5, 1958   4 Sheets-Sheet 3

INVENTOR:
Joseph N. Koehegyi
BY

United States Patent Office 3,181,599
Patented May 4, 1965

3,181,599
PROCESS TO RAISE COMBUSTION
TEMPERATURES
Joseph N. Koehegyi, 310 Riverside Drive,
New York, N.Y.
Filed Mar. 5, 1958, Ser. No. 719,309
4 Claims. (Cl. 165—1)

This invention relates to increasing combustion temperatures. More particularly, this invention relates to increasing combustion temperatures by a novel method of heat production.

There are several known methods for raising combustion temperatures, such as preheating the combustion participants or the materials which are to be heated. This invention utilizes a principle which has hitherto not been used in this art, namely, the connection of heat processing units in series, as is done with electrical processing units. This invention extends this principle to combustion. The temperature is analogous to voltage in electric circuits, and the heat capacity of gas passing through per unit of time is analogous to current or amperage.

Following the electric analogy, I divide the total amount of combustion calories into fractions by dividing the flow of combustion gases into fractions. I connect these fractions in series by transferring the combustion heat in heat exchangers from one pre-connected fraction of combustion products, that is of burned gases, to the next connected fraction of gaseous combustion participants, consisting of oxygenous gases, like air, enriched air, tonnage oxygen, pure oxygen, etc., and of fuel gases like carbon monoxide, hydrogen, methane derivatives, acetylene, etc. Herein the short term air will be deemed to represent any of said oxygenous gases in many instances. I may repeat the combustion of such fractions several times and in each case I transfer the sensible heat remaining after the combustion of the particular fraction to preheat the combustion participants of the next fraction. Again, this is analogous to electric connecting in series. In this way, as in the case of galvanic elements, the starting temperature of combustion participants of a subsequent fraction begins at the final temperature of the combustion products of the preceding fraction. Thus, each fraction begins at the final temperature of the former fraction and contributes to raising the temperature further according to its own combustion heat and heat capacity. However, again in analogy with electrical currents and corresponding to the first principle of thermodynamics, I have eventually only the gas flow and the heat capacity of one single fraction at my disposal. Out of the fractions that are to be connected in series, only the last fraction, with the heat capacity of this fraction only, is retained for the combustion process that is intended to be utilized. The combustion products of all the preceding fractions cool down to almost the temperature of the surroundings in heat exchangers and are then passed out into the free air so that they no longer take part in the process.

There is a difference between connecting combustion devices in series, according to this invention, and the electrical analogy in that electric energy is sometimes connected in series in many steps. In contrast, the temperatures which arise at the usual combustion are so high in relation to the existing refractory materials (at least where undiluted gases are used) that connecting in series will usually be possible only two of three times.

In the drawings FIGURE 1 is a schematic illustration of a simple embodiment by way of example of the invention applying two combustion devices and utilizing heat at a location remote from both.

Figure 1:
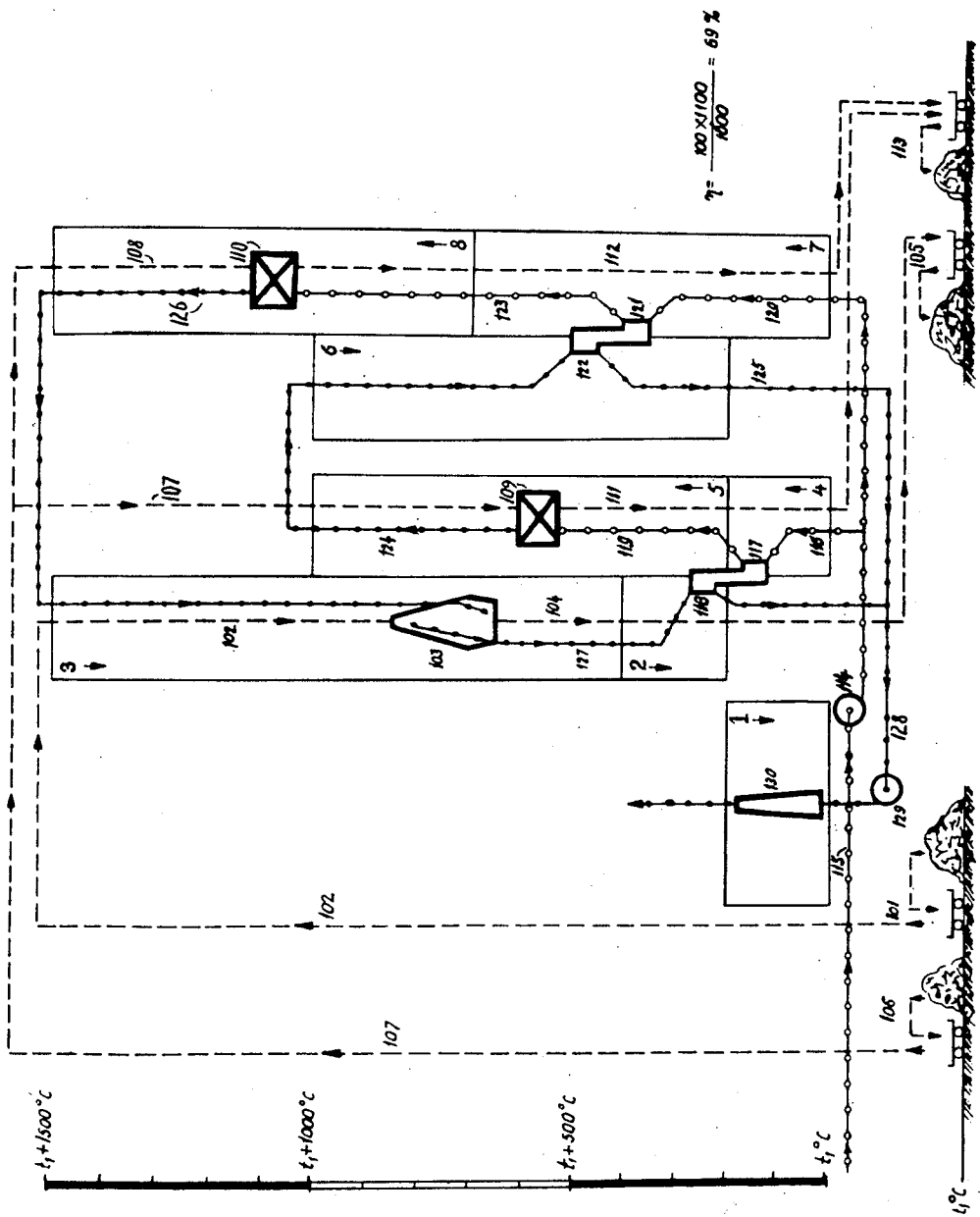

Intermittent lines denote transfer of solids; lines with hollow circles indicate conduction of air; lines with crosses indicate conduction of fuel gases; plaited lines indicate conduction of higher caloric power fuel gases and lines with solid dots indicate conduction of combustion products.

At the extreme left of each of the drawings there is a temperature scale indicating the temperature range changes. The temperature $t_1$ denotes ambient temperature.

Each single apparatus is placed into one or two larger size rectangles denoted by thin lines. The width of these rectangles denotes the product of the weight of the gas flow passing per unit of time times the mean specific heat at constant pressure, whereby the upper temperature limit for computing the mean temperature is represented by the top boundary line of the rectangle and the lower limit by the bottom boundary line. This equals the heat capacity flowing per unit of time. The heights of the rectangles denote change in temperature, that is warming up or cooling down in degrees centigrade. Thus, the areas of the rectangles denote heat quantities flowing per unit of time (measured in calories flowing through per unit of time). Whether the area of a particular rectangle denotes heating up or cooling down is indicated at its lower or upper ends, where there is a number of one or two digits to be seen, in contradistinction to all the other numbers of the drawings of three digits, and which is provided with an arrow pointing upwards if the temperature increases and downwards if the temperature decreases. If I take the two different directions of the arrows as positive and negative I may obtain the heat balance of the heat quantities (that is calories) flowing and on each drawing the sum of these rectangles denoting increase and decrease of temperature, equals zero.

The efficiency denoted by the Greek letter eta ($\eta$) is equal to the hundredfold proportion of the heat obtaining areas of the rectangles of the heat utilizing units to the heat input areas of the rectangles of the heat utilizing units (if any, none in FIGURE 1) plus those of the combustion chambers. Each eta efficiency figure also implies a heat loss corresponding to the irreversibilities in the process, which augment the entropy of the environment. Such losses are shown, for the sake of demonstration, in the drawings, for example the stack loss corresponding to supposedly 200° C. for the total flow, and losses in the heat exchangers corresponding supposedly to 100° C. for any one of the corresponding fractional flows, while other possible losses are not demonstrated and taken into account.

The example represented by FIGURE 1 shows units 109 and 110 connected in series. In this case the two units represent combustion fractions equal to each other. In the example shown by FIGURE 1, in the utilizing unit no combustion takes place. The utilizing unit 103 receives heat from the preceding combustion chamber 110 in the form of the sensible heat of the combustion gases as is usual, for example, in muffle furnaces. But it would make no important difference if the combustion in unit 110 had been placed into the utilizing unit 103, as is usual, for example, in tunnel, vertical, rotating or Hoffman furnaces; that is, in ceramic, glass, cement and metal manufacturing furnaces, in high temperature chemistry, or in welding apparatus.

In FIGURE 1, 101 denotes the stored raw materials to be heat treated in the utilizing unit 103, and, after heat treatment, which are to be transported therefrom and stored at 105. The route of transportation is denoted by the dotted lines 102, 104. The combustibles are stored at 106 and their route leads through 107, 108 to the combustion chambers 109, 110, while the combustion wastes are removed as shown by the dotted lines 111, 112 to the waste pile 113. The fan 114 forces air flows into the combustion chambers 109, 110 through the conduits 115, 116, 119 and 120, 123, shown as lines with small circles. These air flows pass through heat exchangers 117, 118 and 121, 122. In these heat exchangers they absorb the sensible heat of the combustion gases. The combustion gases escape through the stack 130 into the atmosphere after having passed through conduits 124, 125, and 126, 127, 128 denoted by lines with solid dots and having been transported by the fan 129.

Connecting in series in two stages, according to FIGURE 1, is achieved by transferring the combustion heat of the combustion chamber 109 to the heat exchangers 121, 122 and thereby increasing the temperature of the air flow which feeds into the combustion chamber 110. The first gas flow passes through 124, 125, 128 and the stack and is eliminated from the process. The second half of the air flow coming from fan 114, which passes into combustion chamber 110, has now been preheated and its temperature will be raised still further by its own combustion. The resulting flow of combustion products will pass through conduit 126 to the utilizing furnace 103 and in the furnace will give up as many calories of its own heat content as possible. This transfer will generally be only partly possible because the particular manufacturing process may be such as to end with a temperature lying considerably above ambient temperature. This flow of combustion products flowing through conduit 127, will still have some disposable heat content, which is transferred to the first air flow, incoming through conduit 116, in the heat exchanger 117, 118. From the heat exchanger the exhausted combustion products are eliminated from the process through conduit 128, fan 129 and stack 130, while the pre-heated fresh air flows through conduit 119 to the combustion chamber 109.

The process of this invention is not confined only to connecting in series. Partial connections in series are also possible. That is, the connection in series may be combined with the usual parallel connecting of heat flows. If it is desired, for example, to raise the temperature with a lesser degree than obtained by dividing into two equal halves, then the division may take place in a pattern deviating from equal halves. For example, the total gas flow of the heat capacity $x$ plus $y$ is divided into a flow of the heat capacity $x$ and two other flows of heat capacity of $y/2$ each. The two $y/2$ capacity flows may then be connected with each other in series, so that one of the two flows of the capacity of $y/2$ each is burned up and is eliminated from the process after transferring its transferrable heat to the other flow of $y/2$ heat capacity. This latter fresh gas flow, the temperature of which had been elevated in series, remains in the process and is connected in parallel with the third flow of the capacity $x$. Thus, the heat capacity of the retained total flow will be $x+y/2$. Again other examples are: a gas flow of higher heat capacity may pass through the heat input side of a heat exchanger than passes through the heat output side, or, if combustion products passing through the heat imparting side of an exchanger are products of combustion participants of a composition, which differs from the composition of the combustion participants passing through the heat receiving side.

Figure 2:
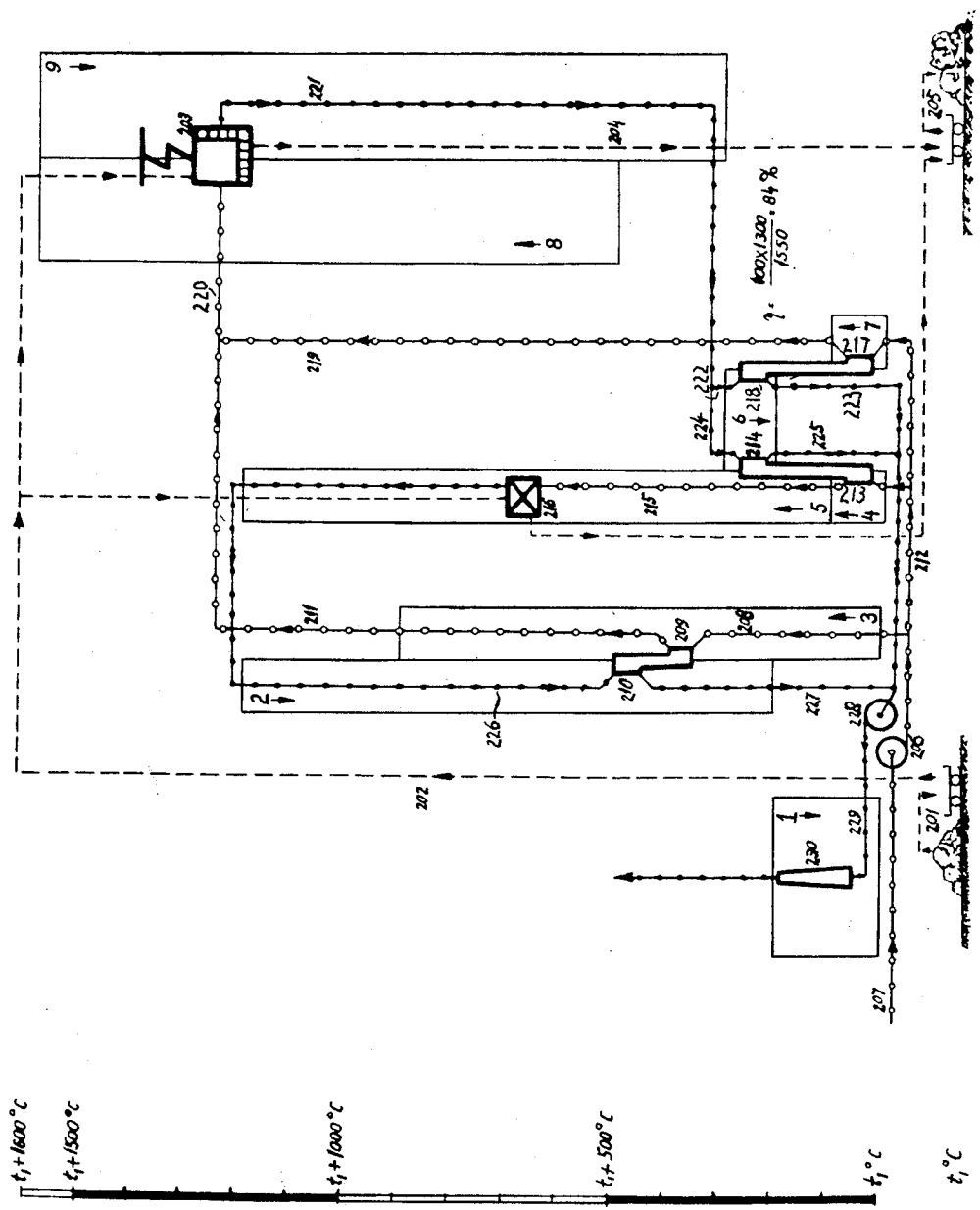
FIGURE 2 is a schematic illustration by way of example of a device embodying the invention in which the combustion devices are partly in series and partly in parallel, and applied to a steam generator.

In FIGURE 2 a mixed connection, partly in series and partly in parallel, is shown with a steam generator. Out of the three air flows, each representing a fraction of one-third of the total flow, two are connected in series and the retained flow out of these two is connected with the remaining third fraction in parallel.

The symbols in FIGURE 2 are the same as in FIGURE 1, but the heat utilization unit 203 denotes a steam generator, which is provided with a superheater, a water preheater and an air preheater. The superheater and the water preheater are included in the symbol 203. However, the air preheater is denoted in FIGURE 2 separately from the generator symbol 203, and its function is represented by the heat emitting rectangle by the heat content rectangle No. 6, which is the downward continuation of the rectangle No. 9 (the further continuation downwards of rectangle No. 6 is included in the rectangle No. 1 surrounding the stack). The air preheater unit is denoted by the heat exchangers 213, 214 and 217, 218.

By following the same conventions utilized in FIGURE 1, which have previously been described, it is noted that in FIGURE 2 the solid combustibles are taken from source 201 along flow line 202 to the steam generator 203 and the waste is discharged on flow line 204 to dump 205. Inlet air at 207 passes through fan 206 and by line 208 to heat exchanger 209, 210 and then by line 211 and line 220 to the steam generator. Inlet air also passes by line 212 to heat exchanger 213, 214 and then by line 215 to combustion device 216. Inlet air also passes through heat exchanger 217, 218 and line 219 to the steam generator 203.

Exit gases from the steam generator pass by line 221 and line 222 to the heat exchanger 217, 218, and then by line 223 and fan 228 and line 229 to stack 230. Exit gases also pass by line 221 and line 224 to heat exchanger 213, 214 and then by line 225, to the fan and stack. Exit gases from combustion device 216 pass by line 226 to heat exchanger 209, 210 and then by line 227 to the fan and stack.

The connection in series is represented in FIGURE 2 by the heat transfer from the combustion products in conduits 224, 225 in the rectangle 6 between the preheaters to the air flow in conduit 215, which flow takes up additional combustion heat in 216, and by the elimination of the ensuing flow of combustion products from the process through conduits 226, 227, after transferring its transferable heat content to the air, which flows through conduits 208, 211, and the heat exchanger 209, 210. The two remaining uneliminated streams, i.e., the one which has been heated by connecting in series in the conduit 211, and the stream 219, which has the remaining half of the total capacity of the initial stream 207, and which has been preheated in 217 in the usual way of preheating by means of the utilization waste heat, are then connected in parallel with each other, for the two streams in conduits 211 and 219 merge into a single stream in conduit 220.

The process according to the present invention has further combinative possibilities in the well-known processes in which the utilized combustion heat is transferred to solid bodies, e.g., where ceramic products are made. In this case it is in many processes usual to include these products themselves in the heat exchanging. These processes could be so combined with connecting in series that the waste heat yielded by the heated-up solid product, for example clinker, when it cools down again, is included in the process of connecting in series, for example, in the exit half of a tunnel furnace.

Furthermore, processes which heretofore could have been carried out only by electrothermic processes, meaning consumption of expensive electric energy, can be replaced by the present invention with a solely thermic process, i.e., with combustion connected in series, e.g., in manufacturing carbides, corundum (fused alumina), graphite, high temperature refractories, etc.

Figure 3:
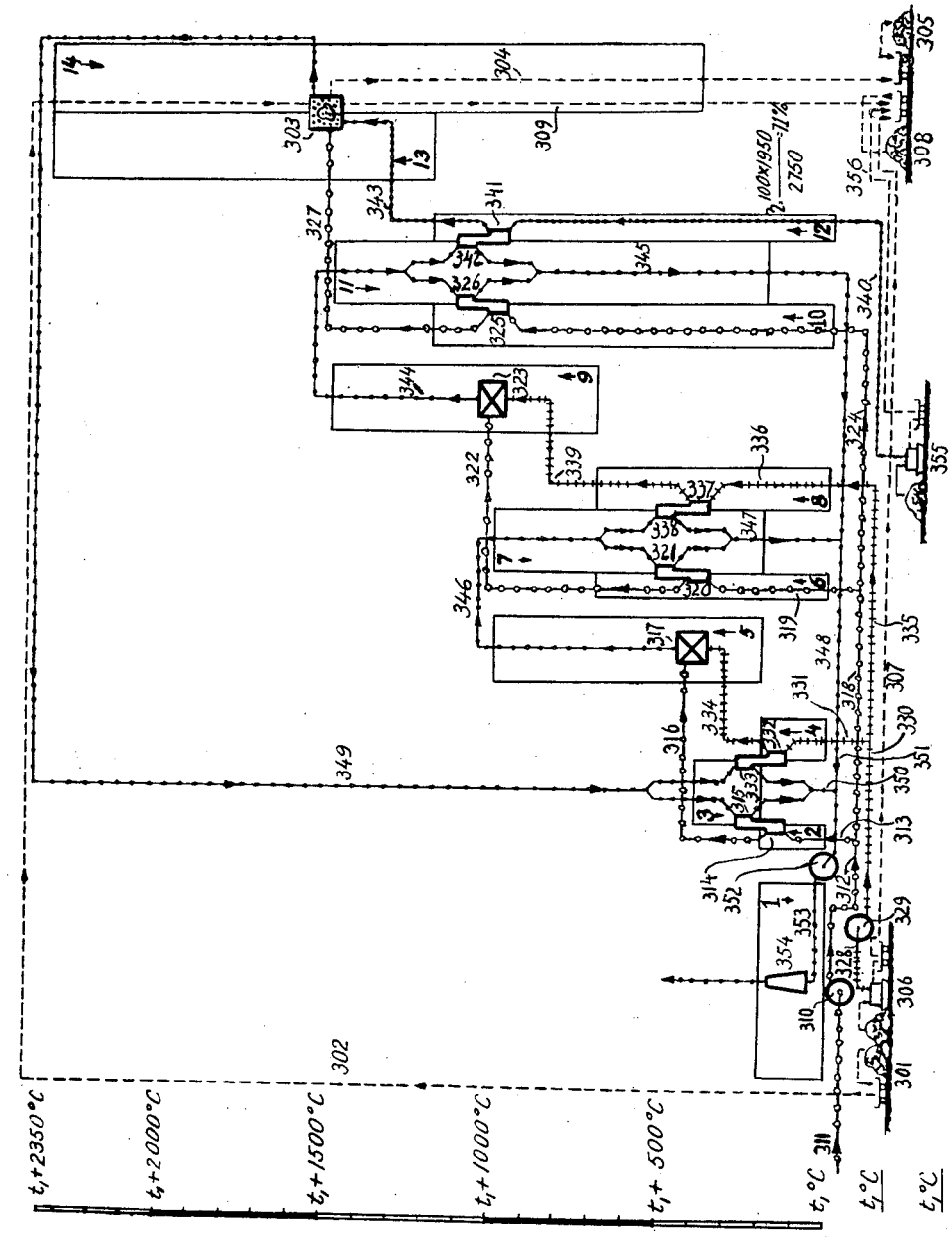
FIGURE 3 is a schematic drawing of a device by way of example according to the invention which is employed in heating solid material to exceptionally high temperatures.

In FIGURE 3, the utilizing unit 303, which may be used for manufacturing carbide, corundum, graphite, or other high temperature refractories, consists of a bed formed of the particular material itself in a sintered state. In the drawing the connection in series is represented in three stages. In the example of FIGURE 3 the combustion chamber is not supposed to be made for the combustion of solid fuels, like coal, etc., but for the use of gaseous fuels, for example producer gas. Both, the incoming fuel gas and the air stream are connected in series with corresponding fractions of the combustion products, which, in this example, are not assumed to be of equal capacities.

Using the conventions previously described, raw material from the source 301 takes flow line 302 to utilizing device 303 and finished products leave the utilizing device by flow line 304 to deposit point 305. Inlet air at 311 blown by fan 310 through line 312 passes by line 313 through heat exchanger 314, 315 through conduit 316 to combustion device 317. Inlet air also passes through lines 318 and 319 through heat exchanger 320, 321 and then by line 322 to combustion device 323. Inlet air also passes by line 324 through heat exchanger 325, 326 and line 327 to the utilizing unit 303.

Gaseous fuel is generated in source 306 from solid fuel, and the solid waste is eliminated along 307 to 308. The gaseous fuel passes through line 328, through fan 329 and line 330 to line 331 and heat exchanger 332, 333 and then line 334 to the combustion chamber 317. Gaseous fuel also passes from line 330 through lines 335 and 336 to the heat exchanger 337, 338 and then line 339 to the combustion device 323. Fuel of higher calorific power passes from source 355 and line 340 through heat exchanger 341, 342 and line 343 to the utilization device 303. Ash of 355 passes to the dump by line 356.

Combustion gas from combustion device 317 passes through line 346 and then through heat exchangers 320, 321 and 337, 338 and line 347, through line 348 and 351, fan 352 and line 353 to stack 354. Combustion gas from combustion device 323 passes through line 344 and heat exchangers 325, 326 and 341, 342 and line 345 to line 348 and the fan and stack. Combustion gas from utilization unit 303 passes by line 349 through heat exchangers 314, 315 and 332, 333 and line 350 back to line 351 and the fan and stack.

Waste material from the utilization unit passes by flow line 309 to dump 308.

In FIGURE 3, in the first and second connection stages 317 and 323 there is an assumed temperature increase of 800° C. each, while in the third connection stage 303 a higher increase of 1150° C. is presupposed. This can be brought about by employing in the gas conduit 340 a gas of higher calorific content, e.g. water gas, for the combustion in 303, which is produced in the water gas generator 355. Alternatively, instead of using a gas of higher calorific content, the air may be replaced fully or partly by oxygen, tonnage oxygen, etc. The reason why there is a large temperature increase in the third stage is that available refractory materials, which are used for checker work in heat exchangers, are very much limited in their temperature resistance and this limit must not be exceeded in the first two stages while the carbide, graphite, etc., in the third stage are usually embedded in beds consisting of their own material which are consequently self-isolated against heat losses in a manner, which allows for manipulations far above this temperature limit.

Another possibility for connecting in series according to this invention is in the use of the blast furnace. If we connect the existing heat exchangers, for example Cowpers, in series to one or more additional heat exchangers, air of higher temperature can be blown into the furnace so that increased heat quantities can be transferred into the blast furnace from the outside. This, however, will require less heat generation inside the furnace, and this will mean considerable saving in consumption of blast furnace quality coke. In place of the saved blast furnace coke consumption inside the furnace, the increased number of heat exchangers will consume more fuel, for example top gas, so that a smaller quantity will be available for sale. The resulting advantage is then that coke of blast furnace quality, which is very scarce, can be replaced, according to this invention, by other, cheaper fuels, for example, as shown in the drawing, top gas.

Figure 4:
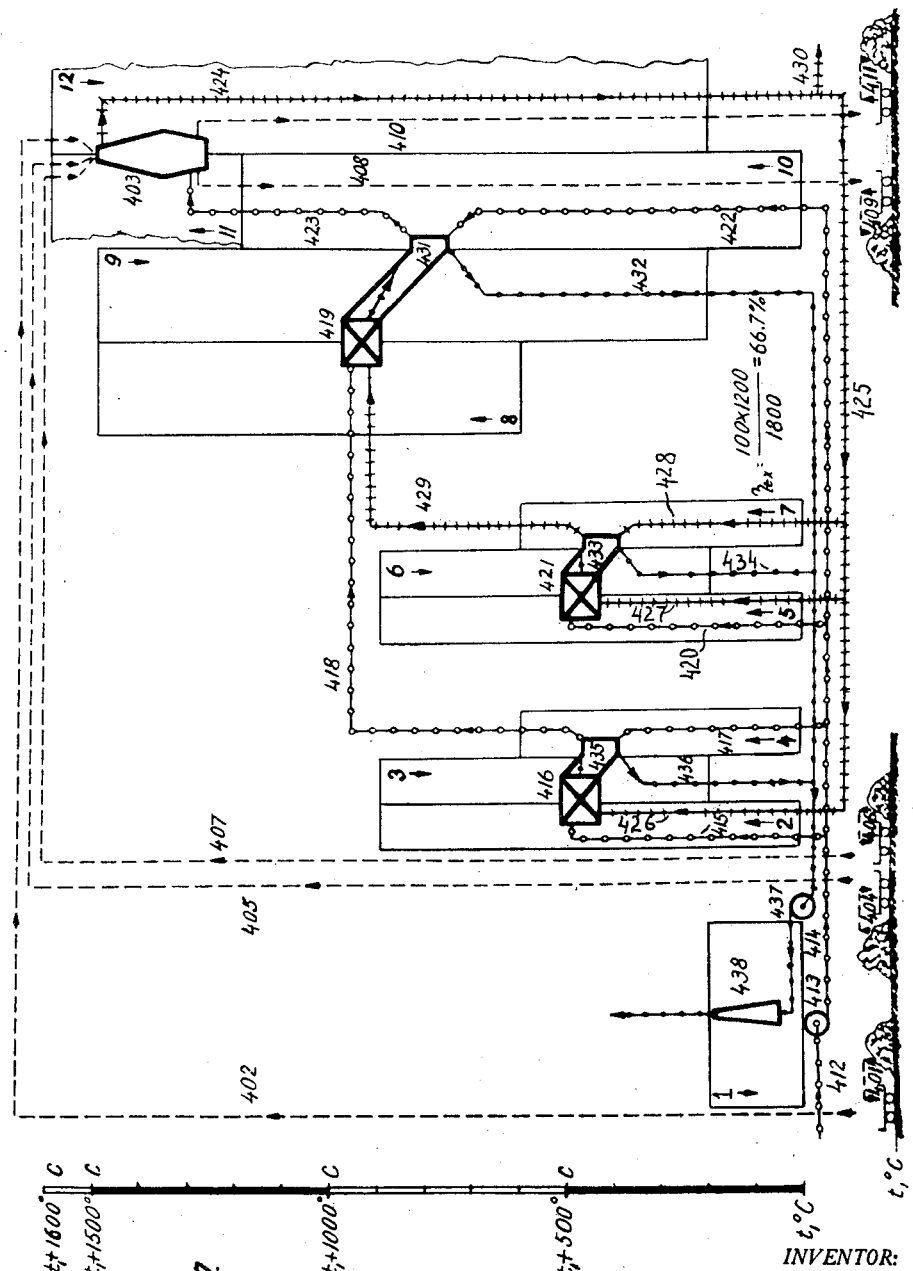
FIGURE 4 is a schematic drawing of a device by way of example according to the invention applied to a blast furnace.

In FIGURE 4 the blast furnace 403 receives ore from storage dump 401 through line 402, lime from dump 404 through line 405 and coke from dump 406 through line 407, and deposits pig iron through line 408 to location 409, and slag through 410 to location 411. The top gas streams out of the blast furnace 403 in conduit 424. It heats the combustion chamber 416 with heat exchanger 435, passing along lines 424, 425 and 426. The combustion heat is transferred in the heat exchanger 435 to air passing through fan 413 along lines 412, 414, 417 and 418 to a pair of Cowpers, of which one is omitted from the drawing and the other represented by Cowper 419, 431. The Cowper is consequently connected in series with the combustion chamber 416 by this heated air stream 418. Another top gas stream heats the combustion chamber 421 with heat exchanger 433 by passing along 424, 425 and 427. The combustion heat is transferred to a third stream of top gases passing through 424, 425, 428 and 429 to the Cowper 419, 431, which is consequently serially connected also with the combustion chamber 421 by the top gas stream in 429. It is also supposed in the drawing that top gas is produced in the blast furnace in a greater quantity than used up by the aforementioned three streams and the excess is conducted out of the furnace and of the process for outside utilization through 424, 430. Inlet air from line 412 through fan 413 and line 414 passes through line 415 to combustion chamber 416 to feed this combustion chamber with air.

The same is the purpose of another stream of inlet air, which passes by line 420 to combustion chamber 421. Again other inlet air passes along line 417 through heat exchanger 435, where its temperature increases, and passes then along 418 to the Cowper 419 to feed the combustion in the Cowper with hot air obtained by the serial connection in series of 419 with 416. A fourth stream of inlet air passes by line 422 through the heat exchanger 431 and is boosted there in series to a particularly elevated temperature by the combustion in 419. This air steam is then forced through 423 into the blast furnace 403 to serve there as an exceptionally hot blast.

Combustion products from heat exchanger 435 pass through line 436 to fan 437 and stack 438. Other combustion products pass through line 434 from the heat exchanger 433 to the stack. Combustion products pass also by line 432 from the heat exchanger 431 to the stack.

The steps in the squares denoted by the numbers of one or two digits, provided with arrows, 1 and 8 to 12 are the steps of the conventional blast furnace operation, while the novel steps shown in squares 2 to 7 serve the purpose of boosting the combustion temperature in Cowper 431 by preceding connections in series, namely: the combustions in 416 and 421 are connected in parallel with each other and both combustions 416 and 421 are connected in series with combustion in Cowper 419. Alternatively, the two parallel streams may be united with each other, or the heating of either the 418 or the 429 stream may be entirely omitted.

A reduction process takes place in the blast furnace 403 concurrently with a combustion process. The relationship of the heat capacities of these two concurrent processes is variable and this is represented in the figure by the broken side line of the rectangles 11 and 12. Consequently, the efficiency proportion denoted by the Greek letter eta has been given in FIGURE 4 as the hundredfold area of the heat obtaining rectangle 10 to the heat producing rectangles 2 plus 5 plus 8, while the heat movements in the rectangles 11 and 12 were not taken into account. Finally it should be borne in mind that the single countercurrent Cowper, which is represented in the drawing, includes both of the pair of regenerative units which must be employed because of the alternating heating and cooling periods.

By the process of this invention, sub or low bituminous coals, lignites, wood, top gases and other fuels with much ballast, e.g., with high oxygen or water content and, for this reason, with small calorific value, can be utilized by series interconnections, in order to reach temperatures which could be obtained heretofore only with the help of high calorie fuels.

What is claimed is:

1. A process of heating materials to elevated temperature, which comprises performing a combustion of combustion participants, consisting of fuel and of oxygenous gas, whereby combustion products and heat are generated, which heat is sensible in said combustion products and is in the bulk transferable, eliminating said combustion products from the process after transferring their transferable heat to further combustion participants, whereby the temperature of said further combustion participants is increased correspondingly to the transferred heat, performing a further combustion of said further combustion participants, whereby the sum of the heat transferred from said former combustion and of the heat generated by said further combustion remains available as sensible heat of the combustion products of said further combustion at the elevated temperature of this further combustion, utilizing what is utilizable of this sensible heat, and transferring the transferable waste heat of said utilization to the first flow of combusiton participants, whereby said waste heat is recovered.

2. A process of heating materials to elevated temperature, which comprises performing the steps that precede utilization of claim 1, repeating said steps while the combustion products of the foregoing step are eliminated from the process after transferring their transferable heat to combustion participants of the next following step, whereby the temperature of the combustion products is increased after each step, utilizing what is utilizable of the sensible heat of the combustion products of the last step, and transferring the transferable waste heat of said utilization to the first flow of combustion participants, whereby said waste heat is recovered.

3. A combustion device comprising a first combustion chamber, a second combustion chamber, a heat exchanger, means for heating materials being heated to elevated temperature, means for supplying combustion participants to the first combustion chamber, means for passing the flow of combustion products of the first combustion chamber including the transferable heat obtained in the first combustion chamber from the first combustion chamber through the heat exchanger, means for passing a further flow of combustion participants through said heat exchanger to pick up the transferable heat of the flow of combustion products of the first combustion chamber and then into the second combustion chamber, means for transferring the transferable heat of combustion products of the second combustion chamber to said materials being heated to elevated temperature, a further heat exchanger for passing the flow of combustion products from the means for heating materials being heated to elevated temperature through said further heat exchanger to recover the waste heat available after heating said materials being heated to elevated temperature, and means for passing a flow of combustion participants through said further heat exchanger to the first combustion chamber to pick up said recovered waste heat and to transfer it to said first combustion chamber.

4. A combustion device comprising a plurality of the heat exchanger and combustion chamber means pertaining to each other of claim 3, connected between the means for heating material being heated to elevated temperature and the other means of claim 3, means for passing the combustion products from the preceding combustion chamber through said or one of the said additional heat exchangers and for passing combustion participants through this heat exchanger into the pertaining additional combustion chamber, means for passing the combustion products of said additional combustion chamber to the next additional heat exchanger or finally to the means for heating materials being heated to elevated temperature, a further heat exchanger, means for passing the flow of combustion products from the means for heating materials being heated to elevated temperature through said further heat exchanger to recover the waste heat available after heating said materials being heated to elevated temperature, and means for passing a flow of combustion participants through said further heat exchanger to the first combustion chamber to pick up said recovered waste heat and to transfer it to said first combustion chamber.

References Cited by the Examiner

UNITED STATES PATENTS

| | | | |
|---|---|---|---|
| 1,840,688 | 1/32 | Andrews | 158—4.5 |
| 1,840,836 | 1/32 | Davis. | |
| 2,632,297 | 3/53 | Ogston | 60—39.17 |
| 2,647,570 | 8/53 | Lockman | 165—95 X |
| 2,814,181 | 11/57 | Schwartz. | |
| 2,869,830 | 1/59 | Cox | 165—1 |

FOREIGN PATENTS 745,104  2/56  Great Britain.

CHARLES SUKALO, Primary Examiner.

HERMAN BERMAN, HERBERT L. MARTIN, PERCY L. PATRICK, Examiners.